United States Patent
Van Sickle

[15] 3,697,125
[45] Oct. 10, 1972

[54] DETACHABLE VEHICLE GLARE SHIELD

[72] Inventor: John Van Sickle, 1841 Billington Road, East Aurora, N.Y. 14052

[22] Filed: Nov. 12, 1969

[21] Appl. No.: 875,929

[52] U.S. Cl. .................................. 296/97 C, 24/81 B
[51] Int. Cl. ............................................. B60j 3/00
[58] Field of Search ............... 296/97 C, 97 R, 97 F; 287/189.35; 24/81 B

[56] References Cited

UNITED STATES PATENTS

| | | | |
|---|---|---|---|
| 3,163,385 | 12/1964 | Lazan, Jr. | 248/37.6 |
| 1,958,934 | 5/1934 | Williams | 160/212 |
| 3,351,375 | 11/1967 | Wheeler | 296/97 |

Primary Examiner—Arthur L. La Point
Assistant Examiner—Robert Saifer

[57] ABSTRACT

A glare shield for detachable mounting to a vehicle sun visor, vertically disposed, as a downward extension thereof, comprising a body of glare reducing sheet material and a separately constructed clip device having opposing arms for engaging the sun visor, a connecting member between the lower end of each arm, a groove in the lower end of one of said arms extending transversely across its width adapted to receive and hold said body as a downward extension of the sun visor, and a raised portion on the outside surface of either arm for gripping the device, said connecting member and attached arms having a minimal downward extent below the lever edge of the sun visor so as not to create distracting images.

9 Claims, 6 Drawing Figures

PATENTED OCT 10 1972　　3,697,125

INVENTOR.

John Van Sickle

DETACHABLE VEHICLE GLARE SHIELD

BACKGROUND OF THE INVENTION

This invention relates to a vehicle glare shield for reducing the glare encountered in driving, and more particularly to a glare shield combining a sheet of glare reducing material with a separately constructed clip device for detachably mounting the sheet to a vehicle sun visor, vertically disposed, as a downward extension thereof in a manner to produce minimal visual distraction from the device.

Under the prior art, as disclosed in applicant's U.S. Pat. No. 3,195,946, the clip is an integral part of the shield and comprises a first arm, which is part of the body of the shield, a connecting member extending outwardly from the body of the shield and a second arm extending from the connecting member in opposition to the first arm. The glare reducing sheet is mounted against the sun visor, disposed in a vertical position, by fitting the clip over the lower edge of the sun visor so that the connecting member presses snugly against the lower edge of the sun visor. The connecting member and the portion of the second arm attached thereto create distracting images as seen by either eye of the operator of the vehicle while looking through the shield. Applicant's pending application Ser. No. 657,550 now U.S. Pat. No. 3,513,427 discloses methods of constructing the connecting member and portion of the second arm attached thereto (together referred to therein as the abutment member) in a manner to reduce the distraction caused by the separate and spaced images of the so-called abutment member as seen by each eye of the operator while looking through the body of the shield at a distant object ahead. The approach is one of coexisting with the inevitable images by controlling their shape and location. In contrast, the present invention provides a method of construction which permits a reduction in the vertical extent of the images to the point they become minimal and unnoticeable. It also provides other advantages, as will be seen below.

The body of the shield is best made of a sheet of transparent glare reducing plastic material. Under the prior art the connecting member, because it extends outwardly from the body of the shield itself, must either be molded or cast with the body of the shield as a unit, as, for example, by injection molding, or else cemented to the body of the shield. In the first case the connecting member will be composed of the same plastic material as the body of the shield. In the second case, it must be composed of the same or a similar plastic material which will dissolve and fuse with the plastic body in order to provide a bond of sufficient strength. A plastic connecting member, it has been found, in order to be of sufficient rigidity and strength to withstand the considerable strain concentrated on it by the outward pressure on the arms of the clip while frictionally engaging the sun visor, requires a vertical extent sufficient to cause distraction from the images of the connecting member as seen below the bottom of the visor by the operator. The present invention, by making possible the use of stronger material in the connecting member thereby makes possible a reduction in the downward protrusion so as to effectively reduce this type of distraction.

The present invention also overcomes other serious disadvantages encountered under the prior art. If the shield were to be molded or cast in one piece, such as by injection molding, it would be difficult if not impossible to obtain in the body of the shield the important optical qualities of clear transparency and lack of distortion to the degree that they are obtainable in a sheet of separately manufactured plastic plate, such as "Plexiglas." Further, it would be impossible by this method to make a shield of polarized material, which material is especially effective in a day shield against road glare. Polarized material, however, is available in sheet form and may be readily used for the body of the shield with the present invention.

In the alternative, if the connecting member were to be cemented to a piece of separately manufactured material, other serious problems would be encountered. First, the joint would be a place of potential weakness. Second, cementing plastic material is a tricky process apt to result in voids in the cemented area, bubbles at the edges, and overruns of cement to other areas, leaving distracting marks and blemishes. In short, cementing is a difficult and time consuming process not suited for commercial production. The present invention eliminates the need for cementing the connecting member to the body of the shield, and permits the use of separately manufactured material for the body of the shield in a method of manufacture suitable for commercial production.

SUMMARY OF THE INVENTION

In summary, the glare shield of the present invention involves the combination of a sheet of glare reducing material with a separately constructed clip device, preferably made of metal and capable of being extruded, such device having in combination (i) opposing arms for engaging and frictionally gripping the lower part of a vehicle sun visor disposed in a vertical position, (ii) a connecting member between the lower end of each arm, such member and the ends of the arms attached thereto, when the shield is attached to the sun visor so disposed, having a minimal vertical extent so as not to create distracting images of the clip device below the lower edge of the sun visor as seen by each eye of the operator of the vehicle, (iii) means for attaching said sheet to said clip device as a downward extension of the sun visor, preferably in the form of a groove in the lower end of one of said arms extending transversely across its width adapted to receive and hold said sheet as a downward extension of the sun visor, into which groove said sheet, constituting the body of the shield, is inserted and held, and (iv) a raised portion on the outside surface of either arm for gripping the device, preferably in the form of a flanged area running transversely along the outer surface of the arm, such raised portion being sufficiently near the juncture of the arm with the connecting member so as to provide a means for gripping the device, while attaching or detaching the shield, without creating resistance by pinching the sun visor.

DESCRIPTION OF THE PREFERRED EMBODIMENTS

Figure 1:
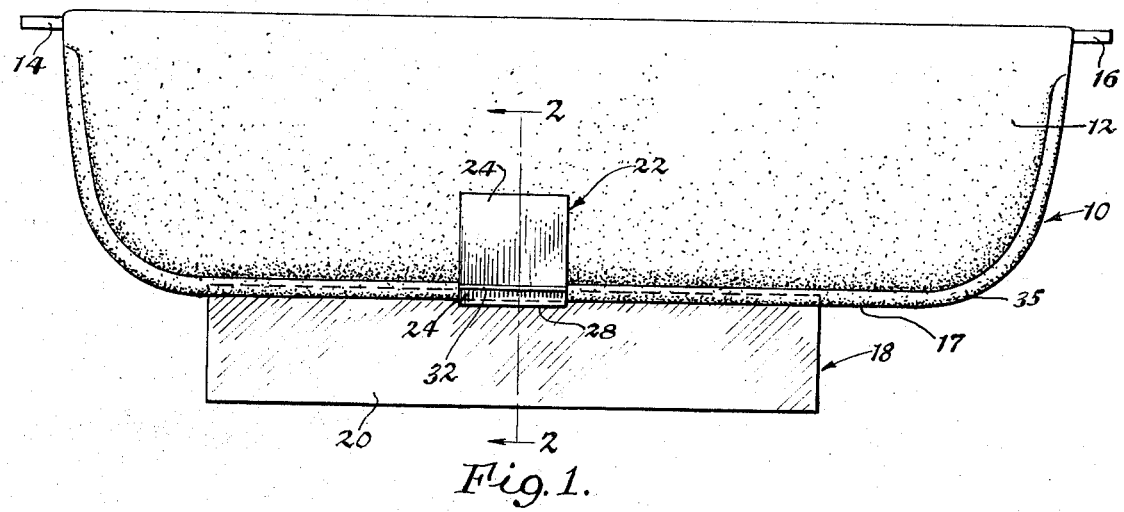
FIG. 1 is an elevational view showing a glare shield of the present invention attached to a vehicle sun visor.

Referring now to FIG. 1, the reference numeral 10 indicates in general a vehicle sun visor, such as is standard equipment on automobiles. As is conventional, the main body 12 of the sun visor 10 is provided with mounting members 14 and 16 by means of which the sun visor 10 is pivotally attached to the inside of the vehicle for movement between an out-of-the-way position and a substantially dependent position transverse to the direction of the vehicle. The sun visor 10 has a generally horizontal lower edge 17.

The glare shield attachment is indicated generally by the reference character 18 in FIG. 1 and includes a main body portion 20, consisting of a sheet of glare reducing material, and a clip device 22, in accordance with the present invention. The body portion 20 preferably is rectangular in shape and extends transversely, in normal position, below the visor with its upper portion overlapping the lower part of the body 12 of the visor. The clip device 22 permits the shield to be positioned on the visor, as a downward extension thereof, at the most convenient location for the operator, and to be tilted if desired.

Figure 2:
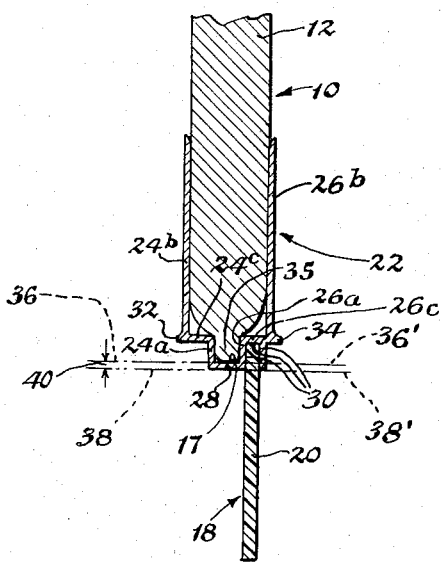
FIG. 2 is an enlarged vertical section taken along the plane of section line 2—2 in FIG. 1 showing the construction of the clip device adapted for use with the conventional padded automobile sun visor.
Figure 4:
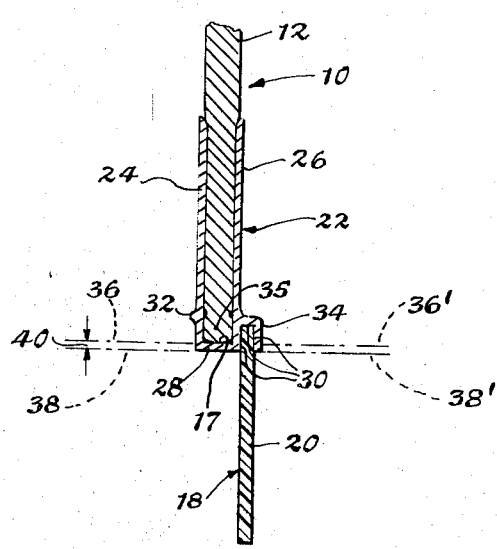
FIG. 4 is a variation of the construction shown in FIG. 2 adapted for use with an unpadded visor.
Figure 6:
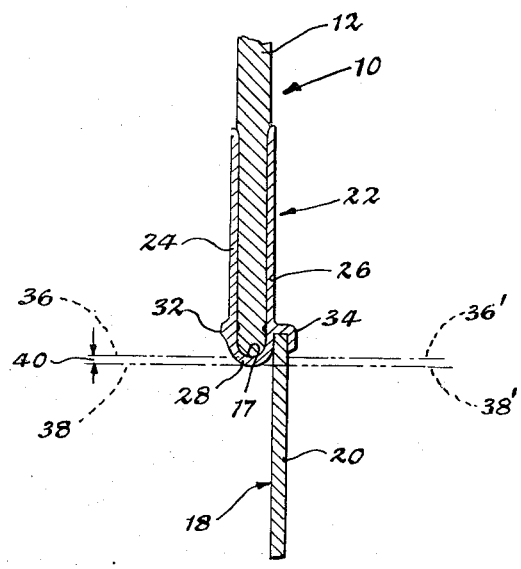
FIG. 6 is a variation of the construction shown in FIG. 4 to show a rounding of the lower part of the clip device.
Figure 5:
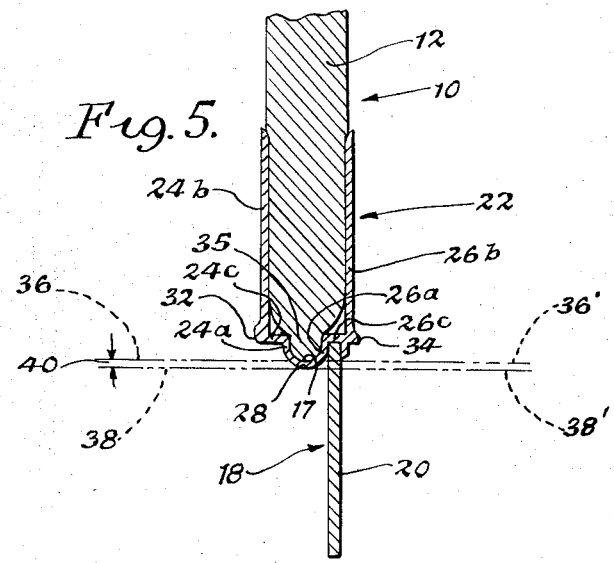
FIG. 5 is a variation of the construction shown in FIG. 2 to show a rounding of the lower part of the clip device.

As more clearly seen in FIGS. 2 and 4, the clip device 22 comprises opposing arms 24 and 26 between the lower end of each of which arms is a connecting member 28. In FIG. 2 the arms 24 and 26 are divided into portions designated a, b and c as more fully described below. The arms 24 and 26 at their upper portions are spaced slightly less than the normal thickness of the body 12 of the sun visor, over which they are placed from below and which they frictionally engage to hold the shield in position. The arms 24 and 26 may be designed to follow, generally, the contour of the sun visor. As shown in FIGS. 5 and 6, the connecting member 28 and the portions of the opposing arms 24 and 26 attached thereto may be rounded to follow the shape of the lower edge 17 of the sun visor and form a groove to fit over such lower edge.

Figure 3:
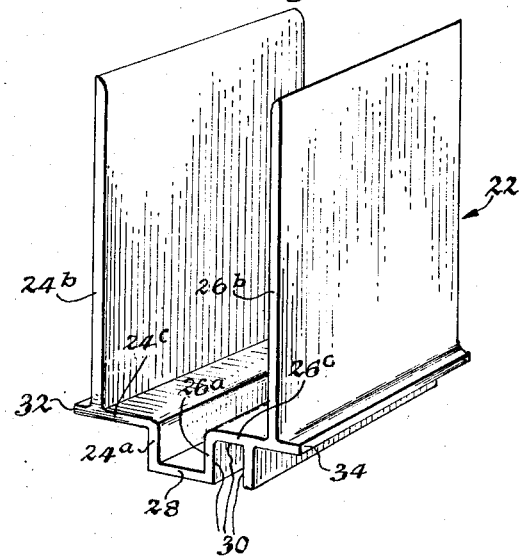
FIG. 3 is an enlarged perspective view of the clip device as shown in FIG. 2.

Best shown in FIG. 3 are walls 30 in the lower end of the arm 26 defining a groove which extends transversely across the width of the arm. As used herein the width of an arm is its transverse extent in relation to the direction of the vehicle. The groove is adapted to receive and hold the main body portion 20 of the glare shield, into which groove such main portion is inserted and held as a downward extension of the sun visor, as shown in FIGS. 2 and 4. The use of a suitable adhesive will assist in holding the body of the shield in the groove. The walls 30, in effect, form a channel along the lower outer side of the arm 26 with the channel opening facing downward, into which channel the main body portion 20 of the glare shield is inserted and held as a downward extension of the sun visor, as aforesaid. While the groove or channel above described is a preferred means for attaching the body of the shield to the clip device, as aforesaid, other means for attachment, such as an adhesive or bond, may be utilized.

On the lower outer surface of each of the arms 24 and 26 are raised portions 32 and 34, respectively, in the preferred form of a flange extending transversely across the width of the arm, as shown in FIG. 3. Such raised portions provide a means for the operator to grip the shield while attaching it to, or removing it from, the main body 12 of the sun visor 10 and are placed near enough the juncture of the arms 24 and 26 with the connecting member 28 so that the attaching or removal of the shield will not be impeded by an increase of resistance thereto created by such arms pinching the body 12 of the sun visor. In FIGS. 4 and 6 the outer wall of the channel formed by the walls 30 serves as the raised portion 34. Because of the firm grip by the opposing arms 24 and 26 on the body 12 of the visor required to hold the shield in a desired fixed position on the visor, the raised portions are needed to prevent the fingers of the operator from slipping along the outer surface of the opposing arms when attaching or detaching the shield. It is important that the shield be gripped by the clip rather than by the body 20 of the shield because to grip the shield by the body 20 would leave finger prints which would tend to impair the clear transparency of the shield and, in addition, to pull on the body of the shield in attempting to remove the shield from the sun visor would tend to remove the body of the shield from the groove in the clip device.

The construction of the arms 24 and 26 in FIGS. 2 and 5 shows a first stage of separation at the lower end of said arms adjacent the connecting member 28 represented by the generally parallel portions 24a and 26a, the distance separating the portions 24a and 26a being slightly greater than the thickness of the bead 35 at the lower edge of the sun visor, and the vertical extent of the portions 24a and 26a being slightly less than the vertical extent of the bead 35. The portions 24a and 26a together with the connecting member 28 form a groove which fits over the bead 35 so that the shield is guided and kept in a vertical position by the bead.

The construction in FIGS. 2 and 5 further shows a second stage of separation of the arms 24 and 26 represented by the generally parallel portions 24b and 26b. These portions are joined to the portions 24a and 26a by the intermediate portions 24c and 26c of the arms 24 and 26. The distance separating the portions 24b and 26b is slightly less than the thickness of the main body 12 of the sun visor so that the arms 24 and 26 at this second stage of separation will engage the main body 12 of the sun visor and frictionally hold the shield to the sun visor as a downward extension thereof.

FIG. 3 further shows the intermediate portions 24c and 26c in the form of a generally horizontal shoulder, with part of the portion 26c also forming the top wall of the groove defined by the walls 30. It will be noted in this construction that by squeezing the arms 24 and 26 towards each other, the groove formed by the walls 30 will tend to open, thus aiding in the insertion of the body 20 of the shield into the groove, and that the groove will tend to close to its original position when the pressure is released, thus tending to hold the body of the shield in the groove. Further, when force is exercised to separate the arms, as when the clip is placed over the lower portion of the sun visor, the groove will tend to close, thus more firmly holding the body of the shield in the groove. By extending the shoulder outwards, raised portions 32 and 34 are formed on the outer surface of the arms 24 and 26 in a convenient place for gripping the clip device and at a location near enough the juncture of the arms 24 and 26 with the connecting member 28 so that when the shield is grasped at such raised portions in attaching the shield to, or removing it from, the sun visor impeding resistance thereto will not be created by the arms pinching the sun visor.

The glare shield 18 is fitted snugly up against the body 12 of the sun visor 10 with the connecting member 28 pressing firmly against the lower edge 17 of the sun visor, as shown in FIGS. 2, 4, 5 and 6. The parallel dotted lines 36—36' and 38—38' represent, respectively, the level of the lower edge 17 of the sun visor and the level of the bottom of the connecting member 28 and attached arms 24 and 26. The distance 40 between the parallel dotted lines 36—36' and 38—38' represents the extent of the downward protrusion of the clip device 22 below the lower edge 17 of the sun visor. The construction of the present invention, by permitting the clip device to be made separately from, and consequently of stronger material than, the body of the shield makes it possible to reduce the downward protrusion 40 so as to be minimal, in which condition the images of the downward protruding portion of the clip device 22, as seen by each eye of the operator, are minimal and not objectionably distracting. Were the distance 40 to exceed about 0.100 inches the images would be apt to be objectionably distracting. The less the distance 40, the less the distraction.

This invention usefully advances the art in that it provides a way to construct a glare shield with a clip device having a minimal downward protrusion below the lower edge of the sun visor, and makes possible the use of previously manufactured high quality plastic sheet material for the body of the shield in a method of manufacture suitable for commercial production.

I claim:

1. For use in combination with a vehicle sun visor and a glare shield, a clip device to attach the glare shield and the visor together in operative position, said visor being disposed substantially vertically and having a transversely extending substantially horizontal lower edge, and said glare shield comprising a body of glare reducing sheet material, said clip device having in combination:
    1. opposing arms fitting over and frictionally gripping the body of the sun visor,
    2. a connecting member between the lower ends of said arms, to which member the arms are joined and held in opposition as aforesaid, and
    3. walls forming a channel extending transversely across the width of one of such arms with its opening facing downward and receiving and holding the body of the shield as a downward extension of the sun visor, one of said walls being formed as an outer surface of the lower end portion of said one arm adjacent the juncture thereof with said connecting member, and the other wall being integral with said one arm whereby said walls tend to close upon each other to grip the glare shield when said arms are spread apart and vice versa.

2. For use in combination with a vehicle sun visor and a glare shield, a clip device to attach the glare shield and sun visor together in operative position, said sun visor being disposed substantially vertically and having a transversely extending substantially horizontal lower edge, and said glare shield comprising a body of glare reducing sheet material, said clip device having in combination:
    1. opposing arms fitting over and receiving the body of the sun visor therebetween,
    2. a connecting member between the lower ends of said arms, to which member the arms are joined and held in opposition as aforesaid, and
    3. walls forming a channel extending transversely across the width of one of such arms with its opening facing downward and receiving and holding the body of the shield as a downward extension of the sun visor, the opposing arms having upper free end portions engaging and frictionally gripping the body of the sun visor and lower end portions spaced apart more narrowly than such upper free end portions, such lower end portions fitting over the lower edge portion of the sun visor and stabilizing the clip device with respect to the sun visor.

3. In combination with a vehicle sun visor, disposed substantially vertically and having a transversely extending substantially horizontal lower edge, a glare shield comprising a body of glare reducing sheet material and a clip device having in combination:
    1. opposing arms fitting over and frictionally gripping the body of the sun visor,
    2. a connecting member between the lower end of each arm, to which member the arms are joined and held in opposition as aforesaid, and
    3. walls forming a channel extending transversely across the width of one of such arms with its opening facing downward and receiving and holding the body of the shield as a downward extension of the sun visor, the opposing arms having a first stage of separation at their lower ends, the arms at this stage of separation together with the connecting member forming a groove fitting over the bead at the lower edge of the sun visor and locating the shield in a vertical position, and a second stage of separation above such first stage of separation connected to such first stage of separation by an intermediate portion of said arms, the opposing arms at such second stage of separation engaging and frictionally gripping the sun visor, the intermediate portion of the opposing arms connecting the first stage of separation of said arms with the second stage of separation of said arms being a substantially horizontal shoulder.

4. A glare shield constructed according to claim 3 wherein a portion of said shoulder extends outwardly to form a raised ridge for gripping the clip device.

5. In combination with a vehicle sun visor, disposed substantially vertically and having a transversely extending substantially horizontal lower edge, a glare shield comprising a body of glare reducing sheet material and a clip device having in combination:

1. opposing arms fitting over and frictionally gripping the body of the sun visor,
2. a connecting member between the lower end of each arm, to which member the arms are joined and held in opposition as aforesaid, and
3. walls forming a channel extending transversely across the width of one of such arms with its opening facing downward and receiving and holding the body of the shield as a downward extension of the sun visor, the opposing arms having a first stage of separation at their lower ends, the arms at this stage of separation together with the connecting member forming a groove fitting over the bead at the lower edge of the sun visor and locating the shield in a vertical position, and a second stage of separation above such first stage of separation connected to such first stage of separation by an intermediate portion of said arms, the opposing arms at such second stage of separation engaging and frictionally gripping the sun visor, and each of said arms having a raised ridge on its outer surface for gripping said clip device to engage and disengage same with said visor.

6. In combination with a vehicle sun visor having an opaque body disposed substantially vertically so as to present a transversely extending substantially horizontal lower edge portion:

a glare shield comprising a body of transparent, glare reducing material having an upper marginal edge portion for disposition in overlapping relation to the lower edge portion of said sun visor so as to form a downward extension of the sun visor; and a clip device for holding and maintaining said glare shield in such overlapping position with respect to the sun visor, said clip device comprising a pair of opposed arms straddling said body of the sun visor and having upper free end portions spaced apart to engage and frictionally grip the body of said sun visor therebetween, a bight portion joining the lower ends of said arms and having an inner wall surface conforming generally with and receiving the lower edge portion of said sun visor thereby to stabilize the clip device with respect to the sun visor, and means for securing said upper edge portion of the glare shield to said clip device, each of said arms having a raised ridge on its outer surface for gripping said clip device to engage and disengage same with said sun visor.

7. The assembly as defined in claim 6 wherein each raised ridge is substantially horizontal and is disposed in the region of said bight.

8. The assembly as defined in claim 6 wherein said means for securing the upper edge portion of the glare shield to the clip device comprises walls forming a downwardly facing channel extending transversely across the outer surface of one of such arms, such channel receiving the upper marginal edge of the glare shield and maintaining it in the aforesaid position with respect to said sun visor.

9. In combination with a vehicle sun visor having an opaque body disposed substantially vertically so as to present a transversely extending substantially horizontal lower edge portion;

a glare shield comprising a body of transparent glare reducing material having an upper marginal edge portion for disposition in overlapping relation to the lower edge portion of said sun visor so as to form a downward extension of the sun visor; and a clip device for holding and maintaining said glare shield in such overlapping position with respect to the sun visor, said clip device comprising a pair of opposed arms straddling said body of the sun visor and having upper free end portions spaced apart to engage and frictionally grip the body of said sun visor therebetween, a bight portion joining the lower ends of said arms so as to be spaced apart more narrowly than such upper free end portions, said bight portion conforming generally with and receiving the lower edge portion of said sun visor thereby to stabilize the clip device with respect thereto, said bight portion having an external wall surface overlapping said lower edge portion of said sun visor and extending substantially parallel with said upper free end portions of the arms, and said clip device including a further wall parallel with said wall surface and defining a downwardly facing channel therewith receiving said upper marginal edge of the glare shield and maintaining it in the aforesaid position with respect to said sun visor.

* * * * *